(12) United States Patent
Hwa

(10) Patent No.: US 9,669,867 B2
(45) Date of Patent: Jun. 6, 2017

(54) CHARACTERIZATION OF STICTION CONDITION IN AN ELECTRICALLY-ASSISTED STEERING SYSTEM

(71) Applicant: GM GLOBAL TECHNOLOGY OPERATIONS LLC, Detroit, MI (US)

(72) Inventor: Ian Y. Hwa, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1 day.

(21) Appl. No.: 14/734,200

(22) Filed: Jun. 9, 2015

(65) Prior Publication Data
US 2016/0362131 A1 Dec. 15, 2016

(51) Int. Cl.
*B62D 5/04* (2006.01)
*B62D 3/12* (2006.01)

(52) U.S. Cl.
CPC .............. *B62D 5/0481* (2013.01); *B62D 3/12* (2013.01); *B62D 5/0424* (2013.01); *B62D 5/0457* (2013.01); *B62D 5/0463* (2013.01)

(58) Field of Classification Search
CPC ...... B62D 5/0481; B62D 3/12; B62D 5/0463; B62D 5/0424; B62D 5/0457

USPC ........................................................... 701/41
See application file for complete search history.

(56) References Cited

U.S. PATENT DOCUMENTS 7,742,899 B2   6/2010 Lemont, Jr. et al.

*Primary Examiner* — Brian P Sweeney
(74) *Attorney, Agent, or Firm* — Quinn IP Law

(57) ABSTRACT

A method for characterizing a stick-slip or stiction condition in an electrically-assisted steering system includes transmitting a first steering control signal from a controller to a rotary actuator as a periodic steering conditioning signal, receiving a second steering control signal via a steering assist motor throughout the test to electrically assist steering, transmitting a third steering control signal to the rotary actuator to cause alternate rotation of the steering shaft to a target angle rate at constant acceleration/deceleration, and measuring a steering torque output from the rotary actuator. A control action is executed when a difference in local maximum and minimum peak amplitudes of the steering torque output exceeds a calibrated threshold difference indicative of stiction. A system includes a rotary actuator, the steering system, a torque transducer operable for measuring a steering torque imparted to the steering shaft by the rotary actuator, and the controller noted above.

18 Claims, 2 Drawing Sheets

CHARACTERIZATION OF STICTION CONDITION IN AN ELECTRICALLY-ASSISTED STEERING SYSTEM

TECHNICAL FIELD

The present disclosure relates to a method and a system for characterizing a stiction condition in an electrically-assisted steering system.

BACKGROUND

Vehicular rack and pinion steering gears include an elongated flat gear or rack having teeth which mesh with mating teeth of a rotating pinion gear. The pinion gear is rotatably mounted on a steering shaft. As a steering angle is imparted to the steering shaft via rotation of a steering wheel, the pinion gear translates via engagement with the rack teeth, which in turn moves the rack in a corresponding steering direction. Tie rods are disposed at the distal ends of the rack. The tie rods are connected to front road wheels of a vehicle via a corresponding steering arm. Therefore, rack and pinion steering gears effectively convert rotational motion with respect to a steering axis into linear motion with respect to the rack while also providing a suitable level of gear reduction.

The steering functionality provided by typical rack and pinion steering gears may be electrically assisted in some designs. For instance, an electric steering motor may impart a steering torque overlay along the steering axis, e.g., in a column electric power steering (EPS) system or a pinion EPS system, while in other designs such as a rack EPS system the electric steering motor delivers torque assist to a particular part of the rack via a suitable drive mechanism. In an example of the latter design, a rotor axis of a steering assist motor is positioned parallel to a longitudinal axis of the rack. A belt, chain, gear set, or pulley system may be used to transfer torque from the off-axis steering assist motor to a ball screw device, and ultimately to the rack itself. Due to close manufacturing tolerances, transient impingement may occur in the various gears or torque transfer mechanisms of the steering system, with such impingement possibly resulting in a stick-slip or "stiction" condition that can affect overall steering precision and feel. The transient and largely unpredictable nature of such a stiction condition can complicate problem isolation, diagnosis, and correction.

SUMMARY

A method and system are disclosed herein for characterizing a stick-slip or "stiction" condition in an electrically-assisted steering system of the types described above. According to the present approach, the steering system is in communication with a controller that is programmed to execute specific test steps of the present method. The method includes executing, in conjunction with active steering assist through the duration of the test, a controlled steering conditioning phase in order to induce the aforementioned stiction condition, and generating a stiction metric for the steering system indicative of the stiction condition. The metric examines differences in local maximum/minimum peak amplitudes of torque spikes occurring at any time during the test as set forth below, with threshold differences being indicative of an unsatisfactorily performing system. An ultimate goal of the present approach is to improve the overall design of the steering system and facilitate validation of the steering system relative to existing test systems and methods.

In particular, a method is disclosed for characterizing a stiction condition for an electrically-assisted steering system having a rack, a pinion gear, a steering assist motor, and a gear drive mechanism. In the system, the pinion gear is disposed on an end of a steering shaft in meshed engagement with teeth of the rack, and the gear drive mechanism is driven via the steering assist motor. While steering assist remains active, a steering control signal is transmitted from a controller to a rotary actuator over a calibrated duration. The first steering control signal is a periodic steering conditioning signal having a calibrated steering frequency and a peak steering angle. The first steering control signal ultimately causes the rotary actuator to deliver a steering input to the steering shaft at the calibrated steering frequency and peak steering angle.

Steering assist remains active through the test such that the steering assist motor electrically assists the rotary actuator in the steering of the rack, e.g., via a calculated or calibrated amount of torque overlay delivered to the rack or along the steering axis according to existing electric power steering (EPS) algorithms of the type well known in the art. Another steering control signal is transmitted from the controller to the rotary actuator after the calibrated duration, i.e., after steering conditioning is complete. The additional steering control signal is a commanded steering angle that causes rotation of the steering shaft to a target steering angle rate with a calibrated constant acceleration/deceleration as explained herein.

The steering torque output from the rotary actuator is measured by a torque transducer connected to the steering shaft or rotary actuator, or another suitable sensor(s), while the rotary actuator rotates the steering shaft with the constant acceleration or deceleration. A control action is executed via the controller, e.g., via an output signal, when the stiction condition is indicated via the previously described threshold steering torque local max/min amplitude comparison.

A related system is also disclosed. In an example embodiment, the system includes a rotary actuator, an electrically-assisted steering gear, a torque transducer operable for measuring a steering torque input imparted to the steering shaft by the rotary actuator, and a controller programmed to execute the steps of the method noted above.

In another embodiment of the method, a first steering control signal is transmitted from a controller to the rotary actuator for a calibrated duration. The first steering control signal in this embodiment is a periodic steering conditioning signal having a calibrated steering frequency of about 8 to 12 Hz and a calibrated peak steering angle of about ±3 degrees. A second steering control signal is received by the steering assist motor concurrent with the first steering control signal so as to cause the steering assist motor to electrically assist the rotary actuator in steering of the rack as noted above.

Additionally, a third steering control signal is transmitted from the controller to the rotary actuator after the calibrated duration while the second steering control signal to the steering assist motor remains active. The third steering control signal causes a rotation of the steering shaft to a target steering angle rate with the constant acceleration/deceleration noted above. This particular embodiment of the method includes directly measuring a steering torque output from the rotary actuator via a torque transducer while rotating the steering shaft with constant acceleration, and then executing a control action via the controller, including recording a diagnostic code in memory of the controller, when the stiction condition is indicated.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
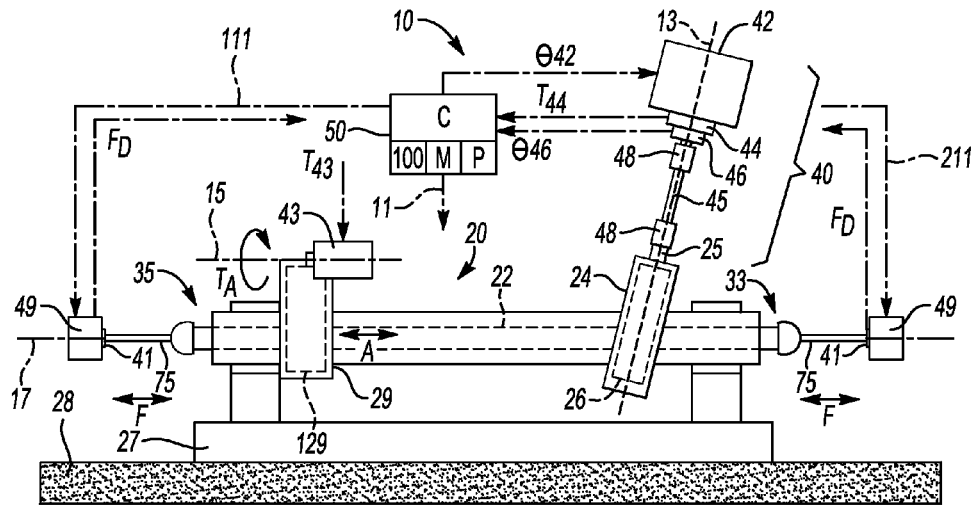
FIG. 1 is a schematic depiction of a test system for characterizing a stiction condition of an example electrically-assisted steering system.

Referring to the drawings, wherein like reference numbers refer to like components throughout the several views, an example steering test system 10 is shown schematically in FIG. 1. The steering test system 10 includes an electrically-assisted steering gear 20 of any of the types noted above, as well as steering control hardware 40 and a controller (C) 50 programmed to execute logic embodying a method 100 using the control hardware 40. The steering gear 20 includes a rack 22 having a first end 33 and a second end 35, and a gear housing 24 containing a pinion gear 26. Execution of the method 100, which occurs while steering assist is active, results in the characterization of a threshold torque breakaway condition, hereinafter a stick-slip or "stiction" condition, in the steering gear 20 as described in further detail below with reference to FIGS. 2A-4.

As a steering input in the form of a commanded steering angle is imparted to a steering shaft 25 about a steering axis 13, typically from a steering wheel (not shown) but via a rotary actuator 42 in the present controlled test environment, the pinion gear 26 disposed within the gear housing 24 engages mating gears (not shown) along the rack 22. The pinion gear 26 thus translates along a longitudinal axis 17 of the rack 22 as indicated by double-headed arrow A. This motion in turn moves the rack 22 in a corresponding direction to steer the front wheels of a vehicle (not shown) within which the electrically-assisted steering gear 20 is to be used.

Depending on the embodiment, a drive mechanism 129 and a drive housing 29 may be positioned proximate the second end 35 of the rack 22 as shown, which is typical of a rack electric power steering (EPS) system. A rotor axis 15 of a steering assist motor 43 may be oriented to enable electrical assist of the steering operation, e.g., through the drive mechanism 129, which may be embodied as suitable gearing, chains, belts, and/or another speed reduction mechanism in such an example embodiment. Although omitted from FIG. 1 for illustrative simplicity, the steering assist motor 43 and associated drive structure similar to the drive mechanism 129 and drive housing 29 may be alternatively positioned on or along the steering axis 13 to form a column or pinion EPS system as noted above. A column EPS embodiment may also include a steering column and an intermediate shaft, as is known in the art, with the steering assist motor 43 delivering steering assist torque to a separate drive mechanism mounted adjacent the steering column. A pinion EPS system, by way of contrast, may place the steering assist motor 43 adjacent to the gear housing 24 such that a steering assist torque acts directly on the rotatable pinion gear 26. Regardless of the embodiment, a fixture 27 and a base plate 28 may be used to secure the steering gear 20 within a test environment.

An electric steering assist torque (arrow $T_A$) is automatically provided to assist a steering maneuver via application of a torque overlay or a supplemental steering torque delivered via the steering assist motor 43 at a level determined in logic, usually of an electronic control unit (not shown) of the steering assist motor 43. This occurs through the duration of the test described herein. The amount of torque overlay the assist motor 43 should generate may be determined, for instance, based on an input torque signal from an internal torque sensor (not shown) located along the steering axis 13 and a variety of other signals such as vehicle speed, ignition state, etc., as is well known in the art. Thus, electric power and steering control signals (arrow $T_{43}$) are provided to the steering assist motor 43 so as to enable the steering assist motor 43 to output the preprogrammed steering assist torque (arrow $T_A$). As noted above, steering assist remains active through the test embodied by method 100, and thus the electric power and steering control signals (arrow $T_{43}$) are provided to the steering assist motor 43 during conditioning and subsequent test execution.

A transient stick-slip or stiction condition may result when using an electrically-assisted system. It is recognized herein that a stiction condition can result when using certain types of linear actuators, i.e., the ball screw mechanism noted above, as part of drive mechanism 129. Although omitted from the Figures for illustrative simplicity, a ball screw mechanism, as is well known in the art, includes a threaded shaft defining a helical raceway containing a collection of ball bearings. The method 100 proceeds from the standpoint of replicating, isolating, and ultimately correcting or preventing the stiction condition from occurring by evaluating torque breakaway characteristics occurring in the steering gear 20. Underlying the present approach is the recognition made herein that the stiction condition, i.e., torque breakaway exhibiting predetermined threshold characteristics as described below, may stem from a transient impingement of ball bearings within the drive mechanism 129. As will be described in detail below with reference to FIGS. 2A-4, the method 100 therefore includes conditioning of the steering gear 20 with a calibrated steering input so as to induce the stiction condition before measuring and evaluating any observed torque breakaway characteristics.

Further with respect to FIG. 1, the control hardware 40 of FIG. 1 includes the rotary actuator 42 such as an electric motor, as well as a torque transducer 44 and a rotary encoder 46, each of which is coaxially aligned with each other along the steering axis 13 of the steering shaft 25. Because axial variation may be present in the control hardware 40, an extension shaft 45 may be coupled to the steering shaft 25 via a set of flexible couplings 48 as shown. The flexible couplings 48 are intended to facilitate connection of the rotary actuator 42 to the steering shaft 25.

One or more linear actuators 49 may be optionally disposed on opposite distal ends 33, 35 of the rack 22 as shown and connected to tie rods 75. The controller 50 may be programmed to control the linear actuators 49 in a coordinated manner using a detected force (arrows $F_D$) from a pair of force transducers 41 so as to command a net zero force along the rack axis 17, i.e., the longitudinal axis of the rack 22, during the conditioning and measuring phases of the method 100. It is recognized that, depending on the performance of the servomechanism employed in the one or more linear actuators 49, the actual force along the rack axis 17 may fluctuate around zero, up to, for instance, +/−1200 N and 30 N, during the conditioning and measuring phases of the method 100, respectively.

Figure 4:
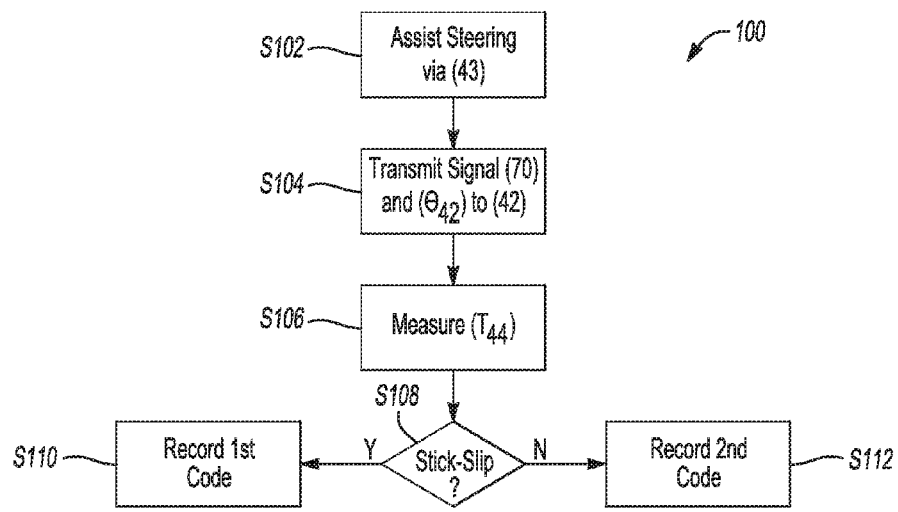
FIG. 4 is a flow chart describing an example method for characterizing stiction characteristics of an electrically-assisted steering system using the test system shown in FIG. 1.

The controller 50 of FIG. 1 may be configured as a host machine, e.g., a digital computer or microcomputer, that is specially programmed to execute steps of the method 100, an example of which is shown in FIG. 4. To that end, the controller 50 is configured with sufficient hardware to perform the required steps, i.e., with sufficient memory (M), a processor (P), and other hardware such as a high-speed clock, analog-to-digital and/or digital-to-analog circuitry, a timer, input/output circuitry and associated devices, signal conditioning and/or signal buffering circuitry. The memory (M) includes sufficient tangible, non-transitory memory such as magnetic or optical read-only memory, flash memory, etc., as well as random access memory, electrically erasable programmable read only memory, and the like. An output signal (arrow 11) may be generated by the controller 50 and used to record a diagnostic code or request execution of other control actions within the scope of the method 100.

As part of the method 100, the controller 50 receives and records a measured steering torque value (arrow $T_{44}$) from the torque transducer 44 and a measured steering angle (arrow $\theta_{46}$) from the rotary encoder 46, and outputs a commanded steering angle (arrow $\theta_{42}$) to the rotary actuator 42. Electronic steering control signals (arrow $T_{43}$) providing the electric steering assist noted herein are received by the steering assist motor 43, with such signals typically transmitted from and internally generated by an integrated electronic control unit (not shown) of the steering assist motor 43 as noted above to determine and control the amount of torque overlay the steering assist motor 43 should generate at any given moment. Thus, the electronic steering control signals (arrow $T_{43}$) ultimately enable the steering assist motor 43 to output a preprogrammed assist torque (arrow $T_A$), as is well known in the art of EPS systems. Force control signals (arrow 111) are output from the controller 50 to the linear actuators 49 to command linear forces (arrows F) and thereby maintain a net zero force along the rack axis 17.

Figure 2A:
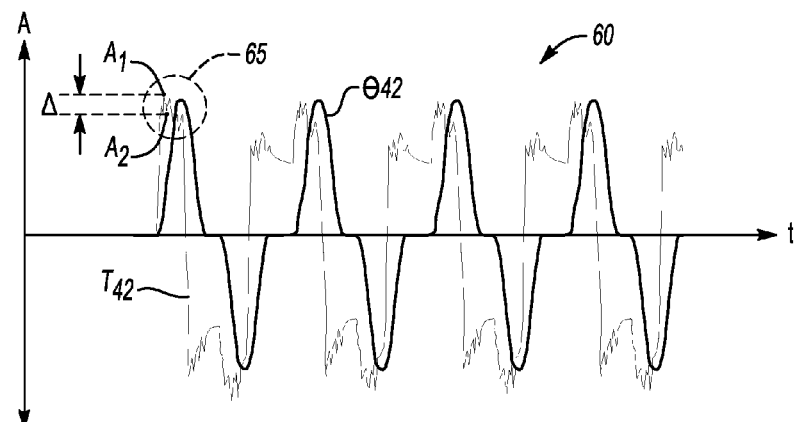
FIG. 2A is a representative time plot of steering torque and steering angle depicting performance of a properly functioning electrically-assisted steering system, with signal amplitude or magnitude plotted on the vertical axis and time plotted on the horizontal axis.
Figure 2B:
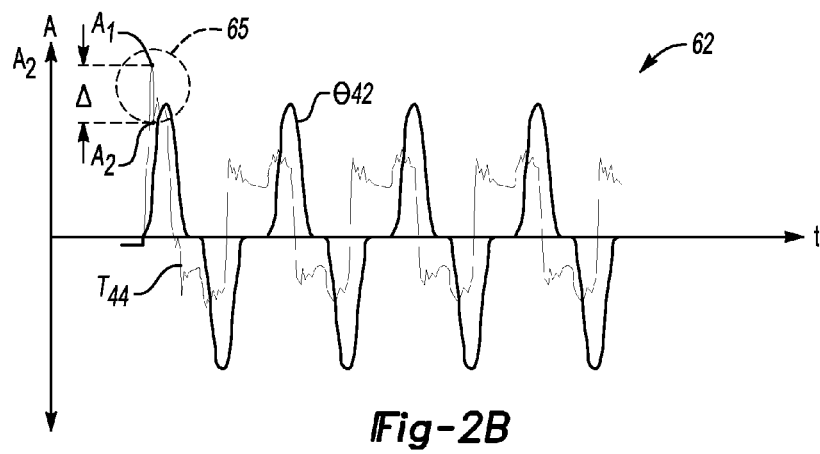
FIG. 2B is an example time plot of steering torque and steering angle depicting performance of an electrically-assisted steering system exhibiting stiction characteristics, with signal amplitude or magnitude plotted on the vertical axis and time plotted on the horizontal axis.

Example traces 60 and 62 are shown in FIGS. 2A and 2B, respectively, to illustrate the measured steering torque value ($T_{44}$). Amplitude (A) is plotted on the vertical axis, which depending on the signal represents torque or steering angle. Time (t) is plotted on the horizontal axis. The upper and lower ranges of the commanded steering angle ($\theta_{42}$) depicted in FIGS. 2A and 2B may correspond to ±10°, while the measured steering torque value ($T_{44}$) may correspond to ±2 Nm, without necessarily being limited to such ranges.

Figure 3:
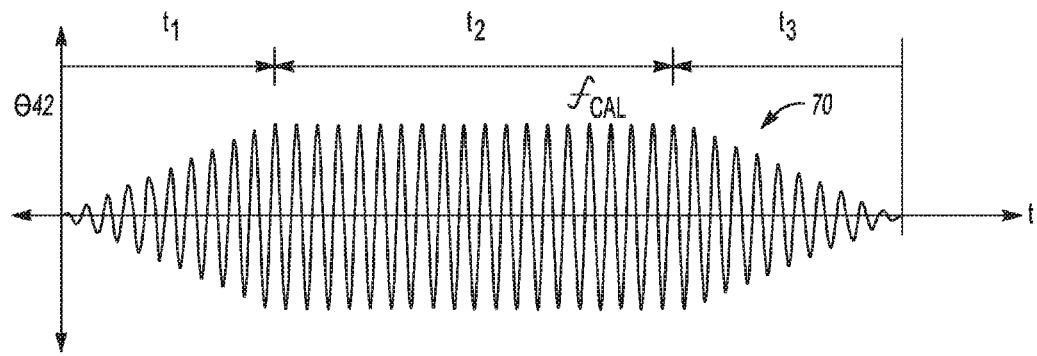
FIG. 3 is an example time plot of a steering conditioning input signal used as part of the present method, with the steering angle signal amplitude plotted on the vertical axis and time plotted on the horizontal axis.

Steering torque disturbances can be detected in the measured torque value ($T_{44}$) by examining the local maximum/minimum (min/max) values of ±peak amplitudes and comparing the difference to a calibrated difference, e.g., 0.3 Nm, or about 0.2 to 0.4 Nm using an example range. The controller 50 of FIG. 1 is programmed to condition the electrically-assisted steering gear 20 as shown in FIG. 3 with electric steering assist active. FIG. 2A is representative of an arbitrarily acceptable torque response, with the local peak amplitudes (points $A_1$, $A_2$) in each zone 65 determined, and a difference ($\Delta = A_1 - A_2$) between each local max/min pair ($A_1$, $A_2$) being compared to a calibrated value. Exceeding the calibrated value at any time during execution of the method may indicate an unsatisfactorily result. By way of contrast, the traces 62 of FIG. 2B depict an example unacceptable torque breakaway response in the steering gear 20, i.e., an unsatisfactory stick-slip/stiction condition. For instance, FIG. 2B may represent a result of $(A_1 - A_2) = 0.5$ Nm, which is in excess of an example calibrated value of 0.3 Nm, and thus indicative of an unsatisfactory result.

FIG. 3 depicts a representative periodic conditioning signal 70 having a calibrated frequency $f_{CAL}$ and with ±steering angle ($\theta_{42}$), plotted on the respective vertical axis and time (t) on the horizontal axis. A purpose of transmission of the periodic conditioning signal 70 via the controller 50 of FIG. 1 is to encourage a transient and otherwise unpredictable stiction condition to manifest itself in a controlled test environment. Stiction due to ball impingement within the ball screw drive mechanism 29 of FIG. 1 can be difficult to duplicate, as the condition can take considerable time to develop and differs widely between steering systems depending on the drive surface and level of vibration present. The conditioning process used as part of the present method 100 is therefore intended to cause the internal ball bearings of the ball screw drive mechanism 129 to settle, a state that, as recognized herein as part of the present approach, can result in a perceptible torque breakaway condition indicative of stiction. The disclosed conditioning process is not limited to the present test method 100, and that other steering tests may benefit from such conditioning. In other words, upon concluding the conditioning portion of the method 100, one may execute any number of control actions and/or tests on a steering system.

Adequate steering conditioning may be provided for the steering gear 20 via transmission of the periodic conditioning signal 70 via the controller 50 of FIG. 1, and resultant control of the rotary actuator 42 through a rising conditioning phase $t_1$, a sustained conditioning phase $t_2$ in which a peak calibrated steering angle ($\theta_{42}$) is maintained, and a trailing conditioning phase $t_3$ as shown. The periodic conditioning signal 70 may be repeated a calibrated number of times. For instance, in a particular embodiment found to be effective during testing, a duration of 1 second (1 s) can be used for each of periods $t_1$ and $t_3$ in FIG. 3, with a duration of 2 s used for period $t_2$, with a corresponding steering angle of ±3° and calibrated frequency $f_{CAL}$ of about 8-12 Hz, or about 10 Hz in another embodiment. Eight cycles of the periodic conditioning signal 70 may be used in this particular embodiment for a total of 32 s of steering conditioning. Conditioning for an insufficient amount of time or number of cycles can result in the problem not manifesting itself, while extended steering conditioning may not yield additional benefits.

Referring to FIG. 4, an example embodiment of the method 100 for characterizing a torque breakaway condition in the electrically-assisted steering gear 20 of FIG. 1 begins with step S102, wherein the steering gear 20 is connected to the control hardware 40 and placed in communication with the controller 50. A steering control signal is received by the steering assist motor 43 of FIG. 1. This causes the steering assist motor 43 to electrically assist in the steering maneuver according to its own existing EPS control algorithms, as noted above, which continues throughout the duration of the test.

At step S104, with steering assist active, the controller 50 transmits the periodic steering conditioning signal 70 of FIG. 3 to the rotary actuator 42 as another steering control signal, doing so for a calibrated duration such as 32 s in the above example. As noted above, the periodic conditioning signal 70 has a calibrated steering frequency and peak steering angle, e.g., about 10 Hz and ±3 degrees in the example embodiment noted above. The periodic conditioning signal 70 may be transmitted for a plurality of cycles, such as the eight 4-second cycles over a 32 s duration embodiment shown in FIG. 3. At the same time, the controller 50 transmits the steering control signal (arrow $\theta_{42}$) to the rotary actuator 42 as yet another steering control signal. This control action occurs after the calibrated duration of the conditioning signal 70 and while EPS assist remains active.

Receipt of the steering control signal (arrow $\theta_{42}$) at step S104 causes the rotary actuator 42 to rotate the steering shaft 25 to a target steering angle rate with constant acceleration or deceleration, e.g., about ±10 degrees/second$^2$(°/s$^2$). That is, steering acceleration/deceleration is closely controlled by the controller 50 of FIG. 1 to ensure a smooth steering response throughout the test. This in turn is intended to ensure that any torque disturbances detected as part of the method 100 are truly due to a torque breakaway condition as gear impingement ceases, and not from any action or noise from the rotary actuator 42.

As an example, and using FIGS. 2A and 2B as references, when starting from a reference/center or 0° steering angle, the steering shaft 25 may be accelerated at 10°/s$^2$ or other suitable constant acceleration value to a target angle rate, e.g., 10°/s. Thereafter, the steering shaft 25 is decelerated back to 0°/s, at −10°/s$^2$ in this instance, to reach a calibrated maximum steering angle, e.g., 10°. This alternating acceleration/deceleration pattern is repeated for the steering shaft 25 to return to the reference/center 0° steering angle. After a pause of about 1 s the entire cycle is repeated in the opposite steering direction, and continues for the duration of the test. The method 100 proceeds to step S106 while the described alternating steering action is ongoing.

Step S106 includes measuring the torque output from the rotary actuator 42 while rotating the steering shaft 25 with the constant acceleration or deceleration respectively to and from the target steering angle rate. A torque transducer 44 may be connected coaxially along the steering axis 13 of the steering shaft 25 such that a rotation of the rotary actuator 42 imparts a steering torque measured by the torque transducer 44. The torque transducer 44 in turn directly measures the steering torque (arrow $T_{44}$) and transmits the measured value to the controller 50. The method 100 proceeds to step S108 once step S106 has completed.

At step S108, the controller 50 of FIG. 1 next receives the measured steering torque (arrow $T_{44}$) and determines if the difference (Δ) between local max/min peak amplitudes of the received measured steering torque (arrow $T_{44}$) exceed, at any point in the test, a calibrated threshold indicative of the stick-slip condition. Such a threshold may be determined offline during testing, as the calibrated threshold may be expected to vary with the particular design of the steering gear 20, the EPS system, and/or the vehicle it used within. That is, some torque values will be perceptible to a driver of a vehicle as a torque disturbance through a steering column while others will not be, with the calibrated threshold amplitude set in memory (M) of the controller 50 for the particular steering gear 20 being tested. The noted 0.3 Nm example is therefore just one possible threshold. The method 100 proceeds to step S110 if the difference (Δ) exceeds the calibrated threshold indicative of the stick-slip condition, as indicated by arrow Y. Otherwise, the method 100 proceeds to step S112 as indicated by arrow N.

Step S110 may include executing a control action with respect to the steering gear 20 or the steering system 10 of FIG. 1. For instance, the controller 50 may generate an output signal (arrow 11 of FIG. 1) to record or output a first diagnostic code, i.e., a response indicative of the stiction condition. Additional control steps may entail using the first diagnostic code to validate a given design of the steering gear 20 or steering system 10, such as by rejecting a given design in a design validation process when the diagnostic code is recorded or building a design specification, or possibly performing a maintenance action on the particular steering gear 20 being tested.

Step S112 is reached when the calculated difference (Δ) does not exceed the calibrated threshold difference, or in other words, when no perceptible stiction condition is detected. Step S112 may entail recording a second diagnostic code via the controller 50, again via the output signal (arrow 11 of FIG. 1), when a threshold stiction condition is not detected. As step S112 indicates a properly-functioning steering gear 20 or system 10, additional control steps may entail using the second diagnostic code to validate a given design of the steering gear 20 or system 10, such as by accepting a given design in a validation process or building a design specification.

As used herein with respect to any disclosed values or ranges, the term "about" indicates that the stated numerical value allows for slight imprecision, e.g., reasonably close to the value or nearly, such as ±10 percent of the stated values or ranges. If the imprecision provided by the term "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method for characterizing a stiction condition using a rotary actuator in an electrically-assisted steering system, wherein the steering system includes a rack, a pinion gear disposed on an end of a steering shaft in meshed engagement with the rack, a steering assist motor, and a drive mechanism driven via the steering assist motor to electrically assist a steering maneuver, the method comprising:

transmitting a first steering control signal from a controller to the rotary actuator for a calibrated duration, wherein the first steering control signal is a periodic steering conditioning signal having a calibrated steering frequency and a calibrated peak steering angle;

receiving, via the steering assist motor, a second steering control signal from the controller during and after transmission of the first steering control signal to thereby cause the steering assist motor to electrically assist in the steering maneuver via the drive mechanism;

transmitting a third steering control signal from the controller to the rotary actuator after the calibrated duration and while still transmitting the second steering control signal, wherein the third steering control signal is a commanded steering angle that causes alternate rotation of the steering shaft, with a constant acceleration and deceleration, respectively to and from a target steering angle rate;

measuring a steering torque output from the rotary actuator while alternately rotating the steering shaft; and executing a control action with respect to the steering system, via the controller, when a difference in a local maximum and minimum peak amplitude of the measured steering torque output exceeds a calibrated threshold difference indicative of the stiction condition.

2. The method of claim 1, wherein the calibrated steering frequency of the periodic signal is about 8-12 Hz and the peak steering angle is about ±3 degrees.

3. The method of claim 1, wherein measuring the steering torque output includes using a torque transducer connected to the steering shaft or to the rotary actuator to directly measure the steering torque output.

4. The method of claim 1, wherein the constant acceleration and deceleration is about ±10 degrees/second$^2$.

5. The method of claim 4, wherein executing a control action includes rejecting the steering system in a design validation process when the diagnostic code is recorded.

6. The method of claim 1, wherein the calibrated threshold difference is in the range of about 0.2 Nm to 0.4 Nm.

7. The method of claim 1, wherein the steering system includes a tie rod and a linear actuator connected to an end of the rack, the method further comprising transmitting a control signal to the linear actuator to command a net zero force along a longitudinal axis of the rack.

8. A system comprising:
a rotary actuator;
an electrically-assisted steering system having a steering shaft, a rack having a rack axis, a pinion gear disposed on an end of the steering shaft in meshed engagement with the rack, a steering assist positioned off-axis with respect to the rack axis, and a drive mechanism connected to the rack and driven via the steering assist motor to electrically assist a steering maneuver;
a torque transducer operable for measuring a steering torque imparted to the steering shaft by the rotary actuator; and
a controller programmed to characterize a stiction condition in the steering system, wherein execution of instructions by the controller causes the controller to:
transmit a first steering control signal to the rotary actuator for a calibrated duration, wherein the first steering control signal is a periodic steering conditioning signal having a calibrated steering frequency and a calibrated peak steering angle;
transmit a second steering control signal to the steering assist motor concurrently with the first steering control signal to cause the steering assist motor to electrically assist in the steering maneuver;
transmit a third steering control signal from the controller to the rotary actuator after the calibrated duration and concurrent with the second steering control signal, wherein the third steering control signal is a commanded steering angle that causes alternate rotation of the steering shaft, with a constant acceleration and deceleration, respectively to and from a target steering angle rate;
determine a steering torque output from the rotary actuator while alternately rotating the steering shaft; and
execute a control action via the controller with respect to the steering system when a difference in a local maximum and a local minimum peak amplitude of the measured steering torque output exceeds a calibrated threshold difference indicative of the stiction condition.

9. The system of claim 8, wherein the calibrated steering frequency of the periodic signal is about 10 Hz and the peak steering angle is about ±3 degrees.

10. The system of claim 8, further comprising a torque transducer connected to the steering shaft or to the rotary actuator, wherein the torque transducer is operable for directly measuring the steering torque output.

11. The system of claim 8, wherein the constant acceleration and deceleration is about ±10 degrees/second$^2$.

12. The system of claim 8, wherein the control action includes recording a diagnostic code via the controller and rejecting the steering system in a design validation process in response to the diagnostic code being recorded.

13. The system of claim 8, wherein the calibrated threshold difference is at least about 1.5 Nm.

14. The system of claim 8, wherein the steering system includes a tie rod and a linear actuator connected to an end of the rack, and wherein the controller is operable for transmitting a control signal to the linear actuator to command a net zero force along a longitudinal axis of the rack.

15. A method for characterizing a stiction condition in an electrically-assisted steering system having a steering shaft, a rack having a longitudinal rack axis, a pinion gear disposed on an end of the steering shaft in meshed engagement with the rack, a steering assist motor, and a ball screw drive mechanism connected to the rack and driven via the steering assist motor to electrically assist in a steering maneuver, the method comprising:

transmitting a first steering control signal from a controller to the rotary actuator for a calibrated duration, wherein the first steering control signal is a periodic steering conditioning signal having a calibrated steering frequency of about 10 Hz and a calibrated peak steering angle of about ±3 degrees, and wherein the duration is about 32 seconds;

receiving a second steering control signal from the controller via the steering assist motor concurrently with transmission of the first steering control signal to thereby cause the steering assist motor to electrically assist in the steering maneuver via the ball screw drive mechanism;

transmitting a third steering control signal from the controller to the rotary actuator after the calibrated duration and concurrently with the second steering control signal, wherein the third steering control signal is a commanded steering angle that causes alternate rotation of the steering shaft with a constant acceleration and deceleration respectively to and from a target steering angle rate, wherein the respective constant acceleration and deceleration are about ±10 degrees/second$^2$;

directly measuring a steering torque output from the rotary actuator using a torque transducer while alternately rotating the steering shaft; and executing a control action via the controller, with respect to the steering system, including recording a diagnostic code via the controller, when a difference in a local maximum and a local minimum peak amplitude of the measured steering torque output exceeds a calibrated threshold difference indicative of the stiction condition.

16. The method of claim 15, wherein executing a control action includes rejecting the steering system in a design validation process when the diagnostic code is recorded.

17. The method of claim 15, wherein transmitting a first steering control signal from a controller to the rotary actuator for a calibrated duration includes transmitting the periodic steering conditioning signal for a plurality of cycles at the calibrated steering frequency and the calibrated peak steering angle.

18. The method of claim 17, wherein the plurality of cycles is eight cycles.

* * * * *